US009797598B1

(12) United States Patent
Pozarnsky et al.

(10) Patent No.: US 9,797,598 B1
(45) Date of Patent: Oct. 24, 2017

(54) METHOD FOR CONTROLLING GASEOUS MERCURY EMISSION BETWEEN TWO OR MORE COAL-FIRED COMBUSTION UNITS

(71) Applicant: Great River Energy, Maple Grove, MN (US)

(72) Inventors: Jared D. Pozarnsky, Benedict, ND (US); Joseph D. Flath, Garrison, ND (US); Jeffrey A. Jacobchick, Bismark, ND (US); Cory A. Koppang, Bismarck, ND (US); Rodney N. Swanson, Washburn, ND (US); Lyle K. Lelm, Turtle Lake, ND (US); Mark D. Natwick, Bismarck, ND (US); Morris L. Hummel, Coleharbor, ND (US)

(73) Assignee: Great River Energy, Maple Grove, MN (US)

( * ) Notice: Subject to any disclaimer, the term of this patent is extended or adjusted under 35 U.S.C. 154(b) by 0 days.

(21) Appl. No.: 15/081,565

(22) Filed: Mar. 25, 2016

Related U.S. Application Data (60) Provisional application No. 62/138,247, filed on Mar. 25, 2015.

(51) Int. Cl.
| | |
|---|---|
| *B01D 53/50* | (2006.01) |
| *B01D 53/64* | (2006.01) |
| *B01D 53/74* | (2006.01) |
| *B01D 53/75* | (2006.01) |
| *B01D 53/78* | (2006.01) |
| *B01D 53/79* | (2006.01) |
| *G05B 1/00* | (2006.01) |
| *G05B 6/00* | (2006.01) |
| *G05B 21/00* | (2006.01) |
| *F23J 7/00* | (2006.01) |
| *B01D 53/48* | (2006.01) |
| *B01D 53/34* | (2006.01) |
| *F23J 15/04* | (2006.01) |

(52) U.S. Cl.
CPC ............. *F23J 7/00* (2013.01); *B01D 53/346* (2013.01); *B01D 53/48* (2013.01); *B01D 53/64* (2013.01); *B01D 53/75* (2013.01); *B01D 53/79* (2013.01); *F23J 15/04* (2013.01); *B01D 2251/606* (2013.01); *B01D 2257/30* (2013.01); *B01D 2257/602* (2013.01)

(58) Field of Classification Search
CPC ........ B01D 53/50; B01D 53/64; B01D 53/74; B01D 53/75; B01D 53/78; B01D 53/79; B01D 2251/108; B01D 2257/60; B01D 2257/602; B01D 2257/302; B01D 2258/0283; B01D 2259/124; G05B 1/00; G05B 6/00; G05B 21/00
See application file for complete search history.

(56) References Cited

U.S. PATENT DOCUMENTS

| | | | |
|---|---|---|---|
| 5,695,726 A * | 12/1997 | Lerner | B01D 53/64 423/210 |
| 6,294,139 B1 | 9/2001 | Vicard | |
| 6,447,740 B1 | 9/2002 | Caldwell | |
| 6,475,451 B1 | 11/2002 | Leppin | |
| 6,855,859 B2 | 2/2005 | Nolan | |
| 6,878,358 B2 | 4/2005 | Vosteen | |
| 7,727,307 B2 | 6/2010 | Winkler | |
| 8,092,766 B2 | 1/2012 | Ghorishi | |
| 8,425,868 B2 | 4/2013 | Steen | |
| 8,632,742 B2 | 1/2014 | Keiser | |
| 8,828,341 B1 | 9/2014 | Appelo | |
| 9,023,302 B2 | 5/2015 | Keiser | |
| 9,034,285 B1 | 5/2015 | McCullough | |
| 2003/0091490 A1 * | 5/2003 | Nolan | B01D 47/06 423/210 |
| 2014/0145111 A1 | 5/2014 | Keiser | |
| 2015/0096480 A1 * | 4/2015 | Comrie | B01D 53/508 110/342 |

FOREIGN PATENT DOCUMENTS

| | | |
|---|---|---|
| CN | 1895745 A | 1/2007 |
| CN | 102989305 A | 3/2013 |
| CN | 203223924 U | 10/2013 |

(Continued)

OTHER PUBLICATIONS

Philip Elliot, Hans Hartenstein, Thomas Riethmann and Bernhard W. Vosteen, "Novel Mercury Control Strategy Utilizing Wet FGD in Power Plants Burning Low Chlorine Coal", Paper #93.
Institute of Clean Air Companies, "Improving Capture of Mercury Efficiency of WFDGs by Reducing Mercury Reemissions", Jun. 2014.
Jared D. Pozarnsky, "KLeeNscrub Technology Update—GRE Coal Creek Experience TGIG 7th Annual Workshop", Oct. 2014.

(Continued)

*Primary Examiner* — Timothy C Vanoy
(74) *Attorney, Agent, or Firm* — Glen E. Schumann; Moss & Barnett (57) ABSTRACT

The present invention relates to coal-fired power plants and flue gas emissions and more specifically, to controlling gaseous mercury emissions in the flue gas between two or more coal fired electric generating units within a contiguous power plant site to achieve environmental regulation limits for mercury emissions. This is accomplished by continuously adjusting the application rates of mercury oxidant, which is added to a coal feed to oxidize elemental mercury for improved mercury capturability and aqueous mercury precipitant (liquid), which is added to a scrubber liquor of a wet Flue Gas Desulfurization (FGD) unit to precipitate out oxidized mercury into solid form for improved capture and disposal.

13 Claims, 7 Drawing Sheets

(56) References Cited

FOREIGN PATENT DOCUMENTS

WO  2015013636 A1  1/2015

OTHER PUBLICATIONS

Jared D. Pozarnsky, "2013-2014 Coal Creek Station Scrubber Hg Removal Testing", Dec. 2014.
Jared D. Pozarnsky, "Exorcising the Hg Demons at Coal Creek Station: Wet FGD Hg removal", Jun. 2014.

* cited by examiner

Figure 1

Prior Art

$$2Na_2CS_5 + 3Hg \rightarrow Hg(2HgCS_5) + 4Na$$

METHOD FOR CONTROLLING GASEOUS MERCURY EMISSION BETWEEN TWO OR MORE COAL-FIRED COMBUSTION UNITS

CROSS REFERENCE TO RELATED APPLICATION

This application claims priority to U.S. Provisional Application 62/138,247 filed on Mar. 25, 2015, which is hereby incorporated by reference in its entirety.

FIELD OF INVENTION

The present invention relates to coal-fired power plants and flue gas emissions and more specifically, to controlling gaseous mercury emissions in the flue gas between two or more coal fired electric generating units within a contiguous power plant site to achieve environmental regulation limits for mercury emissions. This is accomplished by continuously adjusting the application rates of mercury oxidant, which is added to a coal feed to oxidize elemental mercury for improved mercury capturability and aqueous mercury precipitant mercury precipitant (liquid), which is added to a scrubber liquor of a wet Flue Gas Desulfurization (FGD) unit to precipitate out oxidized mercury into solid form for improved capture and disposal.

BACKGROUND OF THE INVENTION

Coal, a natural resource, is commonly burned in coal-fired power plants to convert the energy in the coal to other forms of energy such as electricity and heat. Often, such coal-fired power plants include two or more coal-fired combustion Electrical Generating Units "EGUs" or "Units" used to convert coal energy to electricity. Each of these EGUs typically includes a solid coal feed, an air heater, a boiler, an Electrostatic Precipitator (ESP), a wet Flue Gas Desulfurization (wFGD) with a liquid reaction tank, and a chimney stack.

Coal contains contaminants such as mercury and sulfur at variable concentrations, depending on the type of coal deposit and mine source. When coal is burned, flue gas is a natural by-product and the sulfur (S) and mercury (Hg) in gaseous or vapor form are entrained in the flue gas.

Coal fired power plants are required by law to limit emissions of sulfur and mercury carried in the flue gas exiting the plant stack. Effective in 2017, the Environmental Protection Agency (EPA)—Mercury and Air Toxics Standards (MATS) places tighter limits on allowable mercury emissions in the flue gas.

Sulfur can be removed from the flue gas using "Flue Gas Desulfurization" systems before the flue gas finally exits the power plant through the chimney stack. A wet FGD uses a special liquid consisting of water and slaked lime, atomized through spray nozzles in an absorber tower to bind with sulfur dioxide in the flue gas passing up through the absorber to form calcium sulfite and drain by gravity back into the liquid reservoir in the bottom. The captured sulfur (CaS) is removed through continuous blowdown near the bottom of the tank.

However, removing mercury can be more challenging because elemental mercury in its gaseous (vapor) state ($Hg^0$) is inherently stable and therefore resists bonding to other compounds making it difficult to capture in this form. Therefore, chemical additives or reactants are often used to "oxidize" mercury into a more reactive state ($Hg^{2+}$) so it more readily bonds to other compounds.

Mercury oxidant is a common chemical additive applied to the solid coal feed at the front end of a coal-fired combustion unit prior to combustion of the coal. Mercury oxidant reacts with relatively stable elemental mercury ($Hg^0$) to make it a more reactive form of oxidized mercury ($Hg^{2+}$) providing a higher affinity to binding with other chemicals.

Figure 3:
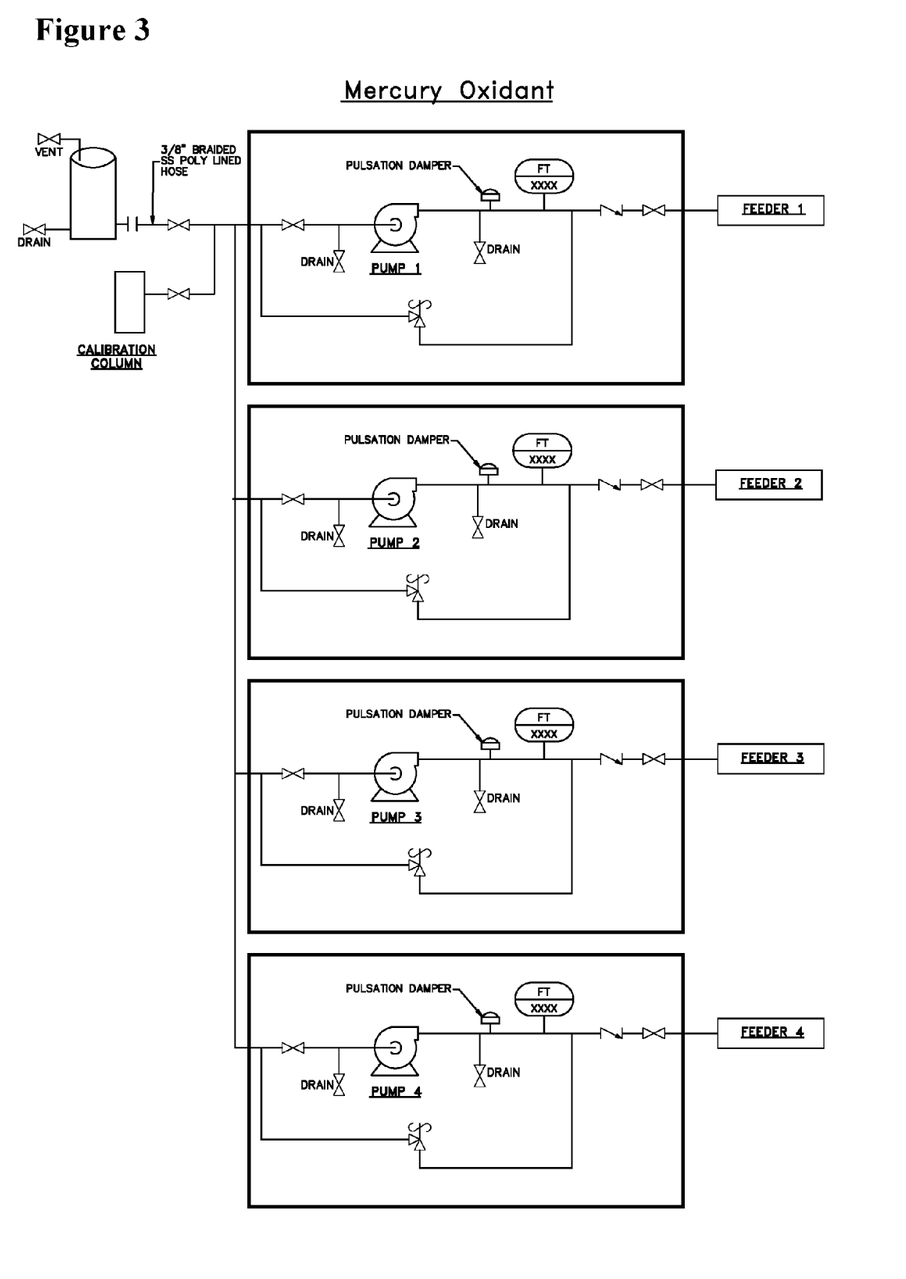
FIG. 3 is a schematic that illustrates the control process flow diagram of the present invention that ensures mercury emission compliance while optimizing the overall effectiveness of mercury oxidant across multiple coal fired power plants on a single site.
Figure 3A:
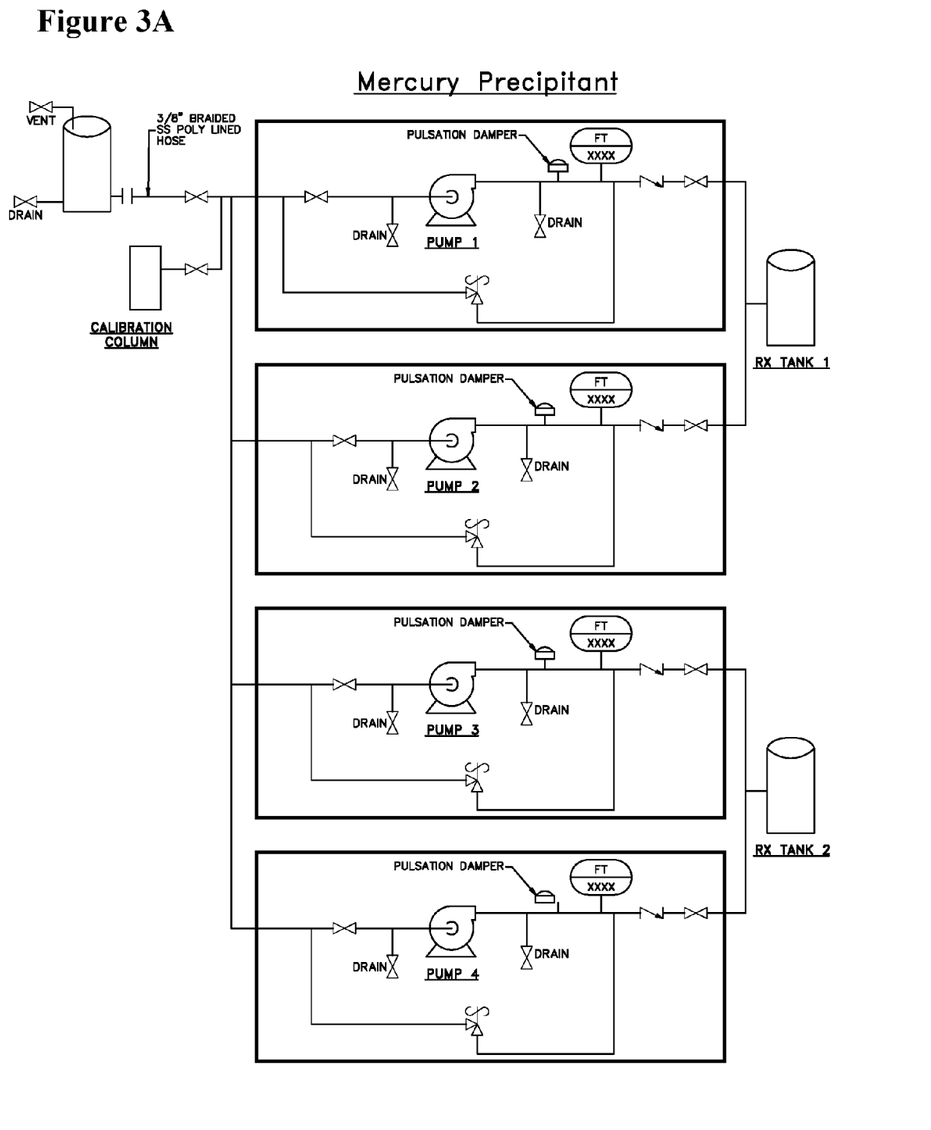
FIG. 3A is a schematic that illustrates the control process flow diagram of the present invention that ensures mercury emission compliance while optimizing the overall effectiveness of mercury precipitant across multiple coal fired power plants on a single site.
Figure 4:
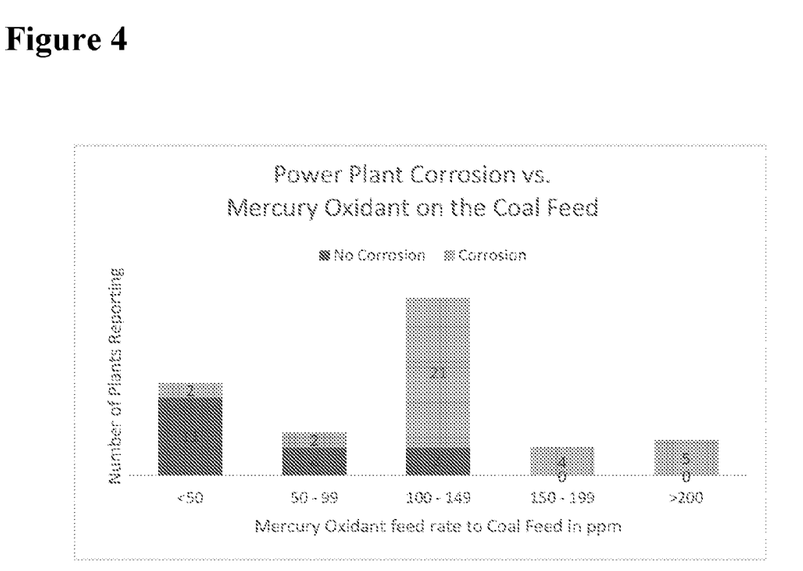
FIG. 4 is a table that illustrates power plant corrosion increases with the concentration of mercury oxidant reactant on the coal feed.
Figure 5:
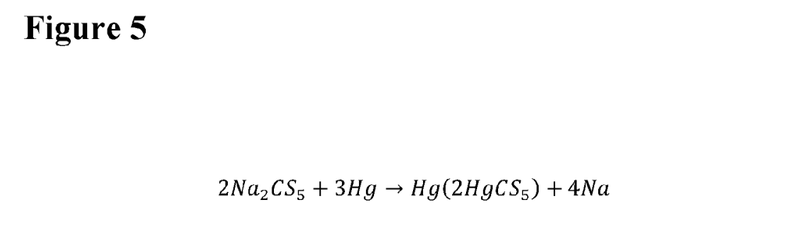
FIG. 5 is a chemical equation illustrating how sodium polythiocarbonate mercury precipitant binds with and precipitates out heavy metals (such as mercury) within the wFGD reactant tanks by forming large and stable polysulfide solid particles.
Figure 6:
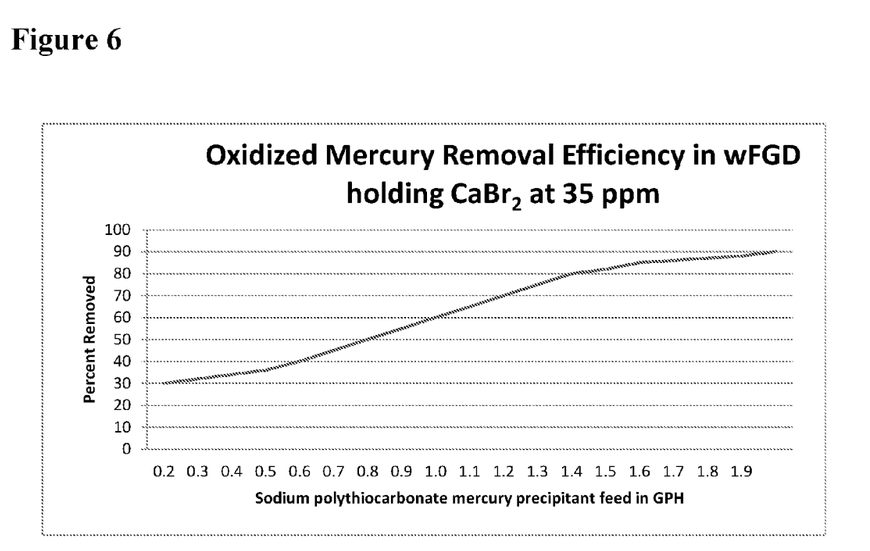
FIG. 6 is a chart illustrating the mercury capture efficiency based on the injection rate of mercury precipitant in the wFGD holding the application of mercury oxidant at a constant rate of 35 ppm.

Unfortunately, mercury oxidant is corrosive to carbon steel throughout the balance of plant when added in higher concentrations (above 100 parts per million (ppm)). FIG. 3 illustrates that higher levels of oxidation reactant create a higher incidence of corrosion. When mercury oxidant levels are above 100 ppm, corrosion becomes a serious side effect in the air heaters and flue gas ductwork in the power plant. Thus, it is of critical importance to keep the concentration of mercury oxidant well under 100 ppm and as low as possible to minimize the corrosive side effects.

Further, the oxidation reaction for mercury becomes less and less effective at higher levels of mercury oxidant on the fuel feed. Adding a secondary mode of mercury capture and removal, such as activated powdered carbon injection or organosulfides in the wFGD maintains mercury oxidant fuel feed additions below the corrosion threshold.

Another method of removing mercury from flue gas is to inject "activated carbon" into the flue gas. Activated carbon uses fine particles or powdered carbon (often referred to as PAC for Powdered Activated Carbon or ACI for Activated Carbon Injection) to chemically attract and bind with mercury. However, activated carbon as a "consumable" carries a high on-going operating cost as well as a high initial capital cost to purchase and install the infrastructure to inject the carbon and remove and dispose of the mercury.

One prior art system for removing mercury from flue gas is described in U.S. Pat. No. 8,632,742. Keiser describes a system for monitoring mercury concentration in a wFGD, correlating the mercury concentration to an amount of precipitant additive required to treat the flue gas and adjusting the amount of additive. However, this system fails to adequately address the influence of mercury oxidant added to the coal feed in the plant, fails to take into account actual stack mercury emissions and utilizes prior art precipitant technology. Additionally, Keiser's technology fails to address emission control issues encountered in power plants with multiple coal fired electric generating units.

Thus, there is a continuing need for a method of reducing mercury emissions in coal fired power plants with multiple coal fired electric generating units while reducing the consumption and operating costs of chemical reactants and their adverse corrosive side effects.

SUMMARY OF INVENTION

The Mercury Control System of the present invention is designed for use with power plants with multiple EGUs and is particularly applicable to combustion units that burn coal containing sulfur and mercury, such as Lignite.

The present invention provides significant operating advantages including cost savings by minimizing the consumption of mercury oxidation and precipitant reactants as well as the benefit of avoiding or reducing the corrosive side effects associated with higher levels of mercury oxidant on the coal feed.

Applicant's Mercury Control System optimizes the amount of mercury (Hg) oxidized across multiple EGUs to achieve regulated limits of mercury and sulfur emissions. Each EGU is somewhat unique in its net unit heat rate and the effectiveness of its particular pollution control equipment including electro static precipitators and wFGD units. These and other factors determine how much mercury capture is required to achieve compliance with current or required emission regulations.

Optimization of oxidized mercury is accomplished by continuously adjusting the application rates of liquid mercury oxidant, which is added to the coal feed of a combustion unit to oxidize elemental mercury for improved capturability, and adjusting aqueous mercury precipitant (liquid), which is added to a scrubber liquor of the wFGD to precipitate out oxidized mercury into solid form for improved capture and disposal, and then nominalizing the results across the multiple coal-fired combustion units. The present invention also utilizes aqueous mercury precipitants (liquid) in the wFGD to precipitate out oxidized mercury into solid form. (Mercury precipitant is a reactant that binds to and precipitates out heavy metals (such as mercury) by forming large and stable polysulfide solid particles allowing them to be continuously removed and remediated in a slurry waste stream. Further, a liquid precipitant is easier to handle, store and control dosage than dry powdered solid reactants such as powdered activated carbon injection.)

In operation, as mercury oxidant concentration increases in the reaction tanks of the wFGD, the mercury oxidant feed on the coal can be reduced as more mercury is oxidized in the wFGD. This allows for better power plant operation at a reduced mercury oxidant feed rate on the order of 10-50 ppm on the coal fuel feed, well under the 100 ppm industry "danger zone" for corrosion. It also reduces costs, as mercury oxidant is more expensive than the required amount of mercury precipitant required to remove mercury from the wFGD.

BRIEF DESCRIPTION OF THE DRAWINGS

Referring now to the drawings, wherein like reference numerals indicate corresponding structure through the several views.

DETAILED DESCRIPTION OF THE INVENTION

For a thorough understanding of the present disclosure, refer to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The Mercury Control System of the present invention is a unique and useful method and system of continuously monitoring stack emissions of mercury and free sulfide ion concentration in the wFGD liquor in order to automatically control the application of mercury oxidant (such as calcium bromide) on the coal fuel feed to achieve required mercury emission requirements. The present invention minimizes the consumption of oxidant to limit the corrosive side effects of high levels of mercury oxidant in a plant and is applied across multiple EGUs within a single plant site in a "nominalization mode" to optimize the use of mercury oxidants by reducing the saturation effect by "over controlling" mercury capture in one or more EGUs while "under controlling" mercury capture in the other EGU(s) to achieve optimum reactant consumption and overall emission compliance as a single emission site.

Figure 1:
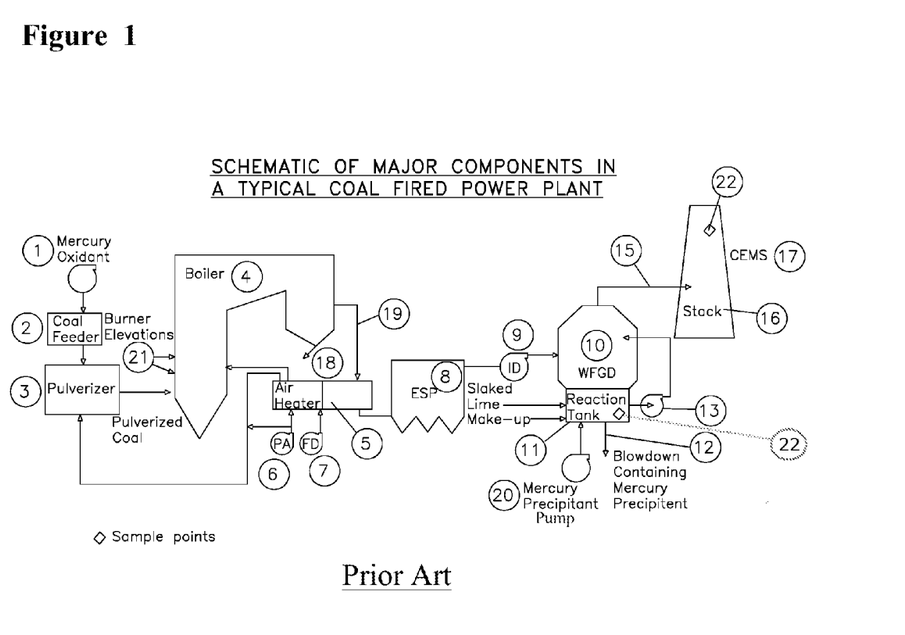
FIG. 1 is a schematic of the major components of a typical coal fired power plant.

Referring to FIG. 1, a schematic of a typical energy plant coal-combustion unit, the unit includes the following major components: a coal feeder 2, a coal pulverizer 3, a boiler 4, an air heater 5 for warming combustion ambient air before it is delivered to the boiler, a primary air (PA) fan 6 for supplying warmed combustion air to the furnace or boiler for proper combustion and to condition and transport solid fuel particles, a forced draft (FD) fan 7 for driving ambient combustion air into the air heater prior to the furnace, an electrostatic precipitator (ESP) 8 for removing contaminants from flue gas, an induced draft (ID) fan 9 for moving the flue gas through ductwork to a wFGD 10 for removing sulfur and mercury including a liquid reservoir tank 11 holding the scrubber liquor wFGD working fluid, a blowdown stream 12 which is a constant flow (liquid) system that removes precipitated mercury and spent calcium sulfite (CaS) after the reaction of lime (Calcium Oxide or CaO) with the sulfur acids in the flue gas, a pump 13 for circulating the scrubber liquor (working fluid) from the reservoir to the spray nozzles 14 of the wFGD, a flue gas duct 15 for directing flue gas to chimney stack 16 through which the flue gas exits the plant.

A Distributed Control System (DCS) takes data from the CEMs and controls the rate of application of oxidant to coal in the coal feeder.

In operation, coal bearing sulfur and mercury, such as lignite, is fed into the feeder 2. A mercury oxidant is then applied by mercury oxidant pump(s) 1 (FIG. 1) in measured quantity to the coal. The mercury oxidant will oxidize the mercury in the coal as the coal is burned.

The mercury oxidant pump(s) 1 are controlled by a feedback loop and a pump selection and "on/off" control switch in the DCS. (A schematic of the DCS is generally illustrated in FIG. 3. Although this schematic is easily understood by a person of ordinary skill in the art, for clarity, references to "FT" refer to "flow transmitter").

Ash, a byproduct from the coal burning process, is removed from the boiler at 18; flue gas, another byproduct of the coal burning process, leaves the boiler at 19 and is treated as described herein.

Flue gas from the boiler is directed to the electrostatic precipitator (ESP) to remove solid particulates (or dust) from the flue gas to achieve select air emission standards.

Figure 2:
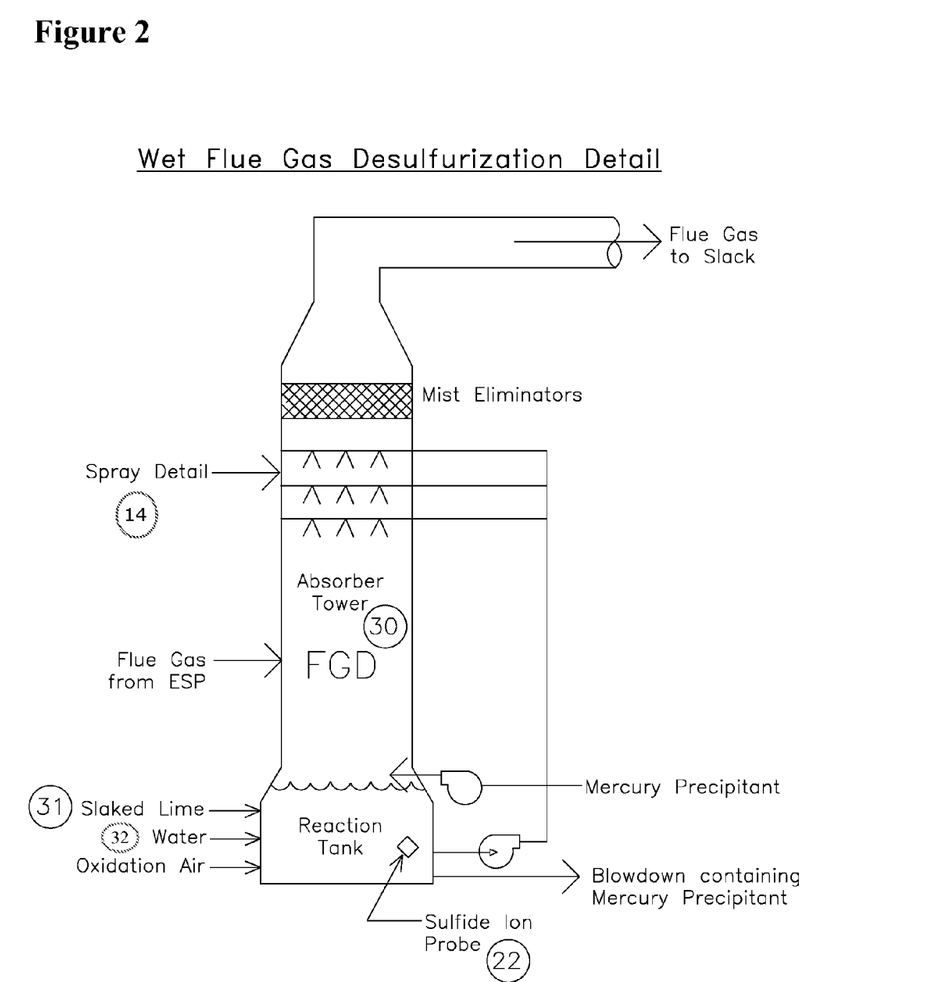
FIG. 2 is a schematic of a wet Flue Gas Desulfurization system illustrating the mercury precipitant interface of the Mercury Control System of the present invention with an existing Wet Flue Gas Desulfurization Unit.

The induced draft fan 9 moves the ESP treated flue gas from the ESP through ductwork to the wFGD absorber tower 30 (FIG. 2). The absorber tower 30 is the main part of the wFGD where a liquor comprised of slaked lime 31 and water 32 contacts the flue gas, condensing out a portion of the sulfur dioxide ($SO_2$) for capture, removal and disposal. A significant temperature reduction occurs from the enthalpy (latent heat of vaporization energy associated with the change of phase) from the "liquid" water and lime slurry absorbing heat out of the flue gas in order to vaporize liquid slurry droplets into "gaseous" water vapor at fully saturated conditions.

A mercury precipitant pump 20 provides a controlled measure of mercury precipitant to the reaction tank to remove oxidized mercury from the flue gas. In one preferred embodiment, the mercury precipitant pumps 20 are controlled by a feedback loop from the free sulfide ion probe in the reaction tank and manual on/off selector switch on the Distributed Control System.

The flue gas in the wFGD is directed through ductwork 15 to the chimney stack 16, a tall, vertical enclosure that then directs the flue gases up and out of the plant into the environment.

A primary active control of the DCS, using input data from the CEMS 17, adjusts the pump feed rate of mercury oxidant on the coal feed up or down to achieve the EGU mercury emission set point. A secondary control, using input data from the free sulfide ion probes 22 in the wFGD reaction tank, maintains an adequate dosage of mercury precipitant in the liquor to bind with oxidized mercury into a solid for optimum capture and disposal. The combination of mercury oxidant plus mercury precipitant is critical for achieving mercury emission compliance without excessive operating and maintenance cost including corrosion.

A control logic uses real time data from mercury emission monitors in the stack and free sulfide ion concentration in the wet Flue Gas Desulfurization liquor to optimize the combination of mercury oxidant on the coal fuel feed to oxidize elemental mercury and mercury precipitant injection into the wFGD liquor tank to precipitate out oxidized mercury in a solid form thereby achieving the required mercury emission standards at a common site with the least amount of reagent. This is accomplished by applying the following steps:

A. Mercury precipitant additive is injected directly into the reaction tanks. This liquor is pumped to the spray nozzles in the wFGD where mercury in the flue gas is placed in contact with the slurry. Since mercury precipitant will react with and be "used up" by other heavy metals in the lime and also any free oxygen in the solution, contact between the mercury precipitant and mercury is maximized in this manner by introducing it into the reaction tank.

B. The mercury precipitant concentration is measured continuously in the tanks using a specific probe set up to detect free sulfide ions. Precipitant reagent pumps ramp up and down to maintain this number at a set point to ensure the optimal amount of reactant is maintained in the reaction tanks, just enough to achieve the desired control, without excess consumption and cost.

C. The active control for the system is the metering pump 1 on the Calcium Bromide. An input from the real time CEMs system (at the stack) is used to ramp the mercury oxidant pump to ensure mercury control at the setpoint per EPA MATS requirements. As long as the wFGD system remains treated with the proper amount of mercury precipitant, removal efficiency will be maximized and mercury oxidant usage will be also be minimized, reducing corrosion and operating costs.

D. A mercury oxidant, such as Calcium Bromide, is added to the lowest elevation burner set in the boiler (see FIG. 1) to maximize residence time in the furnace. By injecting mercury oxidant at the bottom set of burners, there is more time and distance in the hot environment for the chemical reaction to take place.

The present invention controls gaseous mercury emissions between two or more coal fired EGUs on a contiguous emission site ("nominalization"). Testing has shown an disproportionate increase in mercury oxidant is necessary to achieve higher levels of mercury removal. See FIG. 8. Therefore the present invention is designed to maximize the efficiency of mercury removal across multiple EGUs by analyzing the efficiency of each EGU and the entire plant site collectively to obtain the desired mercury emission result.

Figure 7:
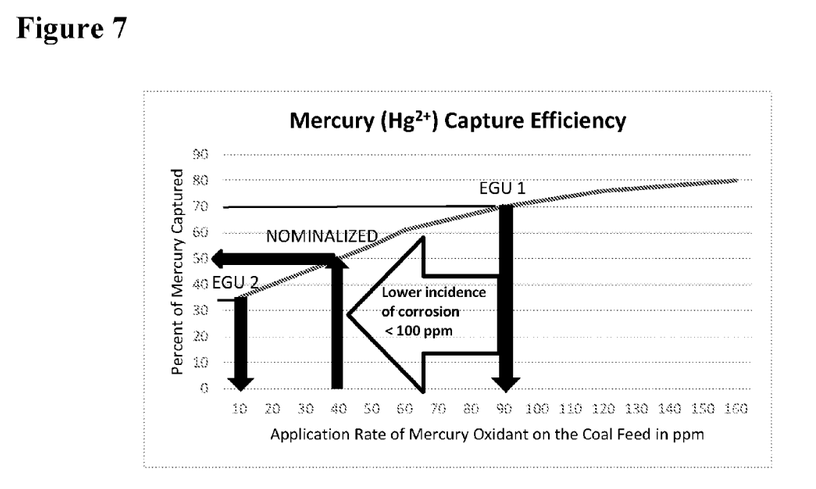
FIG. 7 is a chart illustrating mercury capture efficiency at different application rates of Mercury oxidant on the coal feed in ppm holding mercury precipitant injection at 2 gallons per hour.

FIG. 7 illustrates that testing has shown the modest addition of a mercury precipitant in the wet FGD dramatically improves the mercury removal efficiency holding the application rate of mercury oxidant at a relatively safe and constant rate of 35 ppm.

The control system of the present invention features a "Nominalization Mode" to optimize the emission performance and consumption of mercury oxidant across multiple EGUs sharing a common emission site or plant.

The nominalization mode uses the input signals from each EGU's mercury oxidant pump feed rate to determine if they exceed a predetermined operating range. If one or more EGUs are using a significantly higher dosage of mercury oxidant than the other EGUs, there is an opportunity to reduce overall consumption of mercury oxidant and corrosive effects by optimizing the emission performance for the entire site. A single EGU plant site will have a single mercury emission target to achieve. The nominalization mode overrides individual EGU emission set points with an overall site emission set point. With multiple EGU plant sites it is possible to exceed the mercury emission target on one or more EGUs if other EGUs can be operated well below the emission target.

If the individual EGU oxidant feed rates exceed the predetermined operating range, the control algorithm reduces the highest EGU oxidant feed rates by 0.10% and increases the lowest EGU oxidant feed rates by 0.10% until two conditions are satisfied; 1) the overall site mercury emission target and 2) all EGU mercury oxidant pump feed rates are within the predetermined operating range.

Individual EGUs have different mercury capture efficiency profiles depending on such things as fuel characteristics, operating conditions, specific pollution control equipment, etc.

Different combustion EGUs have different mercury emissions control profiles even if they are the same size combusting similar fuel. By way of a simplified example, One EGU may require approximately 70% mercury removal to achieve the emission regulations under certain operating conditions while a second EGU may only require 40% mercury removal to achieve the same level of compliance. Since 70% mercury removal requires disproportionately more mercury oxidant and mercury precipitant, a fuel, efficiency and capture effectiveness calculation for two or more EGUs achieves the emission regulation with lower oxidant and precipitant application rates and operating cost for the site as a whole.

Figure 8:
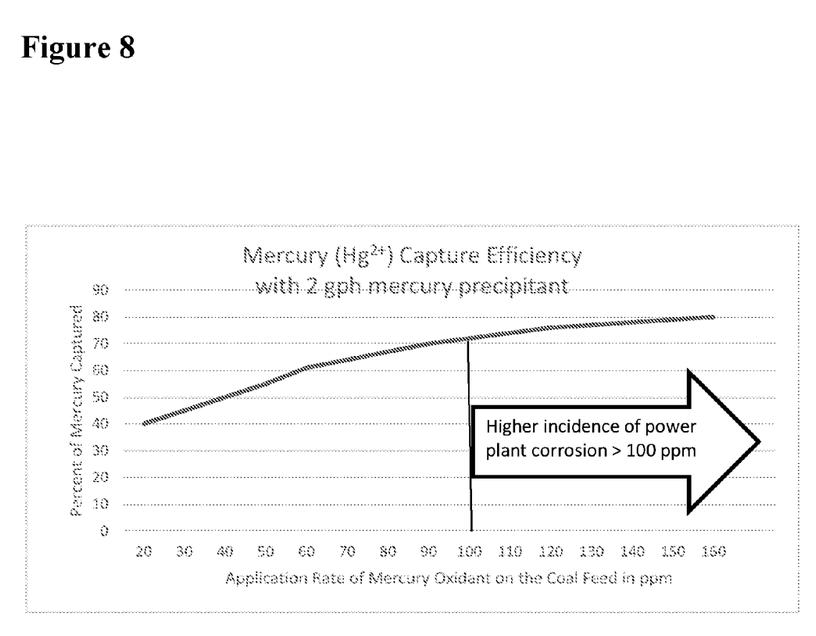
FIG. 8 is a chart illustrating how nominalizing mercury control across multiple EGUs can improve mercury capture at a plant site by reducing overall consumption of mercury oxidant and lower the incidence of corrosion.

In FIG. 8, EGU 2 is operating lower on the capture efficiency curve for oxidized mercury in the wFGD where much less mercury oxidant (<20 ppm) is required, with lower incidence of corrosion. The Nominalization Mode takes advantage of margin of safety in the corrosion limits for EGU 2 by continuously over controlling the more efficient EGU, moving up the curve without jeopardizing the corrosive limits in order to bring EGU 1 down the curve into a safer zone of mercury oxidant (both EGUs at approximate 40 ppm). This monitoring of mercury levels and adjustments is continuous throughout the process of treating the flue gas.

Because EGUs 1 and 2 are at the same power plant (emission "source") and combust the same fuel, the emission readings from the CEMS can be combined and divided by the total fuel input for all EGUs. The net Unit heat rate determines the amount of fuel combusted to produce the net electrical output and establish the "trillion BTU" denominator for the emission calculation.

This nominalization of multiple EGU mercury outputs is illustrated in FIG. 7. EGU 1 is operating higher on the capture efficiency curve for oxidized mercury in the wFGD than EGU 2. Progressively more mercury oxidant (100 ppm) is required to achieve the emission target.

Additional modifications to the present invention are anticipated by the present invention. For example, in some preferred embodiments:

A. two or more coal fired EGUs share a common emission site;
B. mercury precipitant is sodium polythiocarbonate Environmental Energy Services Corp's KLeeNscrub® brand mercury precipitant;
C. calcium bromide is the mercury oxidant;
C. the application rate of mercury oxidant on the coal feed is less than 100 ppm;
D. the boiler includes a number of burner sites and mercury oxidant is injected into the lowest elevation burner set in the boiler (see 21 in FIG. 1) to maximize residence time in the furnace and more time and distance in the hot environment for the chemical reaction to take place.

This Mercury Control System has the following benefits to the coal fired power plant:

A. It lowers the overall consumption of oxidation reactants reducing operating cost of mercury emission compliance.
B. It reduces the corrosive impact of higher levels of oxidation reactant by reducing and proactively controlling the reactant application rates.
C. It avoids the capital cost associated with more conventional PAC/ACI systems.
D. It controls mercury emissions across two or more coal-fired EGUs.

The invention claimed is:

1. A process for efficiently removing mercury from flue gas generated by a power plant including two or more electrical generating units having a coal feeder, a mercury oxidant pump operatively connected to the coal feed, a boiler system for burning coal, a Flue Gas Desulfurization unit including a reactant tank containing a liquor for removing sulfur, a mercury precipitant pump operatively connected to the reactant tank, an emissions stack, continuous emission monitoring probes for monitoring stack emissions of mercury and free sulfide ion concentration in the wFGD liquor, a distributed control system having a first control for adjusting the flow of mercury oxidization reactant by the mercury oxidant pump, efficiency of removing mercury from flue gas being measured by the least amount of mercury oxidation reactant required to achieve a desired level of mercury removal from the combined flue gas output from all of the electrical generation units, wherein:

a. mercury oxidant is applied by the mercury oxidant pump to coal placed into the coal feed;
 b. the coal is fed by the coal feeder into the boiler and is combusted, generating flue gas as a byproduct;
 c. the flue gas is directed to the reactant tank of the Flue Gas Desulfurization unit and treated with the liquor for removing sulfur;
 d. a mercury precipitant is added by the mercury precipitant pump to the reactant tank of the Flue Gas Desulfurization unit to remove mercury from the flue gas;
 e. the treated flue gas is directed out the chimney stack; and
 f. wherein, the distributed control system receives data from the continuous emission monitoring instruments for each electrical generation unit and in response to the information received, continuously adjusts the flow of mercury oxidization reactant by the mercury oxidant pump to maximize the efficiency of mercury removal from the flue gas generated by the combined electrical generation units.

2. The mercury control process for a power plant including two or more electrical generating units of claim 1 wherein the distributed control system has a second control for adjusting the flow of precipitant by the precipitation pump and further including the step of determining the optimum level of precipitant and adjusting the flow of precipitant by the precipitant pump to maximize the efficiency of mercury removal from the flue gas generated by the combined electrical generation units.

3. The mercury control process for a power plant including two or more electrical generating units of claim 1 wherein the precipitant is sodium polythiocarbonate.

4. The mercury control process for a power plant including two or more electrical generating units of claim 1 wherein the precipitant levels are established within a range associated with the level of free sulfide ions in the wFGD reaction tank.

5. The mercury control process for a power plant including two or more electrical generating units of claim 1 wherein one of the continuous emission monitoring probes monitors stack emissions in real time and generate data used to control the application rate of mercury oxidant reactant on the coal feed.

6. The mercury control process for a power plant including two or more electrical generating units of claim 1 wherein the mercury precipitant additive is injected directly into the wet Flue Gas Desulfurization reaction tanks.

7. The mercury control process for a power plant including two or more electrical generating units of claim 1 wherein the distributed control system includes optimizing the amount of mercury oxidation reactant in the coal feed and optimizing the amount of precipitant additive injected in the wet flue gas desulfurization unit to maximize the efficiency of mercury removal from the flue gas generated by the combined electrical generation units.

8. The mercury control process for a power plant including two or more electrical generating units of claim 1 wherein the precipitant is sodium polythiocarbonate and is injected directly into the reaction tank.

9. The mercury control process for a power plant including two or more electrical generating units of claim 1 wherein the precipitant is KLeeNscrub® brand sodium polythiocarbonate mercury precipitant additive and is injected directly into the reaction tank where mercury in the flue gas will contact the scrubber liquor.

10. The mercury control process for a power plant including two or more electrical generating units of claim 1 further including the steps of:
   a. wherein a free sulfide ion probe in the reaction tank continuously measures for mercury precipitant and;
   b. the precipitant pump is adjusted to maintain a desired mercury removal set point to ensure a desired amount of precipitant is maintained in the reaction tanks.

11. A system for controlling mercury removal from flue gas generated by a power plant having two or more electrical generating units, including:
   a. a coal feeder;
   b. a mercury oxidant pump operatively connected to the coal feeder;
   c. a boiler system for burning coal;
   d. a flue gas desulfurization unit including a reactant tank;
   e. a mercury precipitant pump operatively connected to the reactant tank;
   f. a chimney stack;
   g. a mercury control unit for maximizing the efficiency of mercury removal from the flue gas; and
   h. a sulfide ion probe located in the reactant tank for detecting precipitant concentration and communicating the information to the mercury control unit;
   i. wherein the mercury control unit continuously receives data from the sulfur ion probe and in response to the information received, continuously adjusts the flow of mercury oxidization reactant by the mercury oxidant pump and the mercury precipitant by the mercury precipitant pump to obtain a desired amount of mercury removal from the combined flue gas of the electrical generation units using the least amount of mercury oxidation reactant.

12. A system for controlling mercury removal from flue gas generated by a power plant having two or more electrical generating units, including:
   a. a coal feeder;
   b. a mercury oxidant pump operatively connected to the coal feeder;
   c. a boiler system for burning coal;
   d. a flue gas desulfurization unit including a reactant tank;
   e. a mercury precipitant pump operatively connected to the reactant tank;
   f. a chimney stack;
   g. a mercury control unit for maximizing the efficiency of mercury removal from the flue gas; and
   h. a sulfide ion probe located in the reactant tank for detecting precipitant concentration and communicating the information to the mercury control unit;
   i. wherein the mercury control unit continuously receives data from the sulfur ion probe and in response to the information received, continuously adjusts the flow of mercury oxidization reactant by the mercury oxidant pump and the mercury precipitant by the mercury precipitant pump to obtain a desired amount of mercury removal from the combined flue gas of the electrical generation units using the least amount of mercury precipitant.

13. A process for efficiently removing mercury from flue gas generated by a power plant including two or more electrical generating units having a coal feeder, a mercury oxidant pump operatively connected to the coal feed, a boiler system for burning coal, a Flue Gas Desulfurization unit including a reactant tank containing a liquor for removing sulfur, a mercury precipitant pump operatively connected to the reactant tank, an emissions stack, continuous emission monitoring probes for monitoring stack emissions of mercury and free sulfide ion concentration in the wFGD liquor, a distributed control system having a first control for adjusting the flow of mercury oxidization reactant by the mercury oxidant pump, efficiency of removing mercury from flue gas being measured by the least amount of mercury precipitant required to achieve a desired level of mercury removal from the combined flue gas output from all of the electrical generation units, wherein:
   a. mercury oxidant is applied by the mercury oxidant pump to coal placed into the coal feed;
   b. the coal is fed by the coal feeder into the boiler and is combusted, generating flue gas as a byproduct;
   c. the flue gas is directed to the reactant tank of the Flue Gas Desulfurization unit and treated with the liquor for removing sulfur;
   d. a mercury precipitant is added by the mercury precipitant pump to the reactant tank of the Flue Gas Desulfurization unit to remove mercury from the flue gas;
   e. the treated flue gas is directed out the chimney stack; and
   f. wherein, the distributed control system receives data from the continuous emission monitoring instruments for each electrical generation unit and in response to the information received, continuously adjusts the flow of mercury precipitant by the mercury precipitant pump to maximize the efficiency of mercury removal from the flue gas generated by the combined electrical generation units.

* * * * *